United States Patent [19]
Minton

[11] 3,917,927
[45] Nov. 4, 1975

[54] AUTOMATIC RANGING FREQUENCY COUNTER

[75] Inventor: Alfred L. Minton, Spring Hill, Kans.

[73] Assignee: The United States of America as represented by the Secretary of the Navy, Washington, D.C.

[22] Filed: Apr. 15, 1974

[21] Appl. No.: 460,857

[52] U.S. Cl. ..... 235/92 TF; 235/92 FQ; 235/92 CC; 235/92 R; 324/78 D
[51] Int. Cl.² .................. H03K 21/30; G01R 23/02
[58] Field of Search ....... 235/92 TF, 92 FQ, 92 CC, 235/92 EA; 324/78 D, 186, 166 D

[56] References Cited
UNITED STATES PATENTS

| | | | |
|---|---|---|---|
| 3,509,484 | 4/1970 | Basse | 324/78 D |
| 3,525,044 | 8/1970 | Richmond | 235/92 FQ |
| 3,553,728 | 1/1971 | Frank et al. | 324/78 D |
| 3,729,677 | 4/1973 | Band | 324/78 D |

Primary Examiner—Joseph M. Thesz, Jr.
Attorney, Agent, or Firm—Richard S. Sciascia; Joseph M. St.Amand; Darrell E. Hollis

[57] ABSTRACT

An automatic ranging frequency counter comprising a counting register which counts an unknown frequency signal for a measured amount of time. A frequency range detector indicates to a sequence controller and a decade time interval gate the degree of filling of the counter register at the end of said measured amount of time. The sequence controller and decade time interval gate control the commencement and duration of the measured amount of time. When the counting register attains a specific degree of filling after the termination of the measured amount of time, the contents of the counting register are displayed. The measured amount of time is initially small and is increased by decades until the correct frequency range is found, thereby providing the fastest operating speed possible.

7 Claims, 2 Drawing Figures

AUTOMATIC RANGING FREQUENCY COUNTER

BACKGROUND OF THE INVENTION

1. Field of the Invention

The present invention relates generally to frequency counters and more particularly to an automatic ranging frequency counter.

2. Description of the Prior Art

One prior art frequency counter employs a plurality of counting registers which count an unknown frequency signal and a known clock frequency signal. The degree of filling of the counting registers are monitored and counting time is increased or decreased by a decade, depending on the degree of filling of the counting registers. An arithmetic reciprocator or divider is connected between a counting register and the display in order to achieve a correct display. Since the smallest counting time is not initially assumed, the speed of operation is slow. In addition, the necessity of more than one counting register and an arithmetic reciprocator creates a complex, bulky and expensive counter.

SUMMARY OF THE INVENTION

The general purpose of the present invention is to provide an automatic ranging frequency counter that is faster in operation, less complex, less expensive and requires fewer components than prior art automatic ranging frequency counters. To attain this, the present invention provides an automatic ranging frequency counter comprising a single counting register to which an unknown frequency signal is gated by a gate for a measured amount of time. The measured amount of time is controlled by a sequence controller and a decade time interval gate. The measured amount of time is initially small and increased by decades until the correct frequency range is reached. A frequency range detector detects the degree of filling of the counting register and indicates to the sequence controller whether to increase the measured amount of time by a decade or to return to the initial measured amount of time.

Accordingly, one object of the present invention is to provide the fastest operation possible.

Another object of the present invention is to reduce complexity.

Another object of the present invention is to minimize the number of components necessary for operation.

A further object of the present invention is to provide a small, lightweight, inexpensive and reliable automatic ranging frequency counter.

Other objects and a more complete appreciation of the present invention and its many attendant advantages will develop as the same becomes better understood by reference to the following detailed description when considered in conjunction with the accompanying drawings in which like reference numbers designate like parts throughout the figures thereof and wherein:

DETAILED DESCRIPTION OF THE PREFERRED EMBODIMENT

Figure 1:
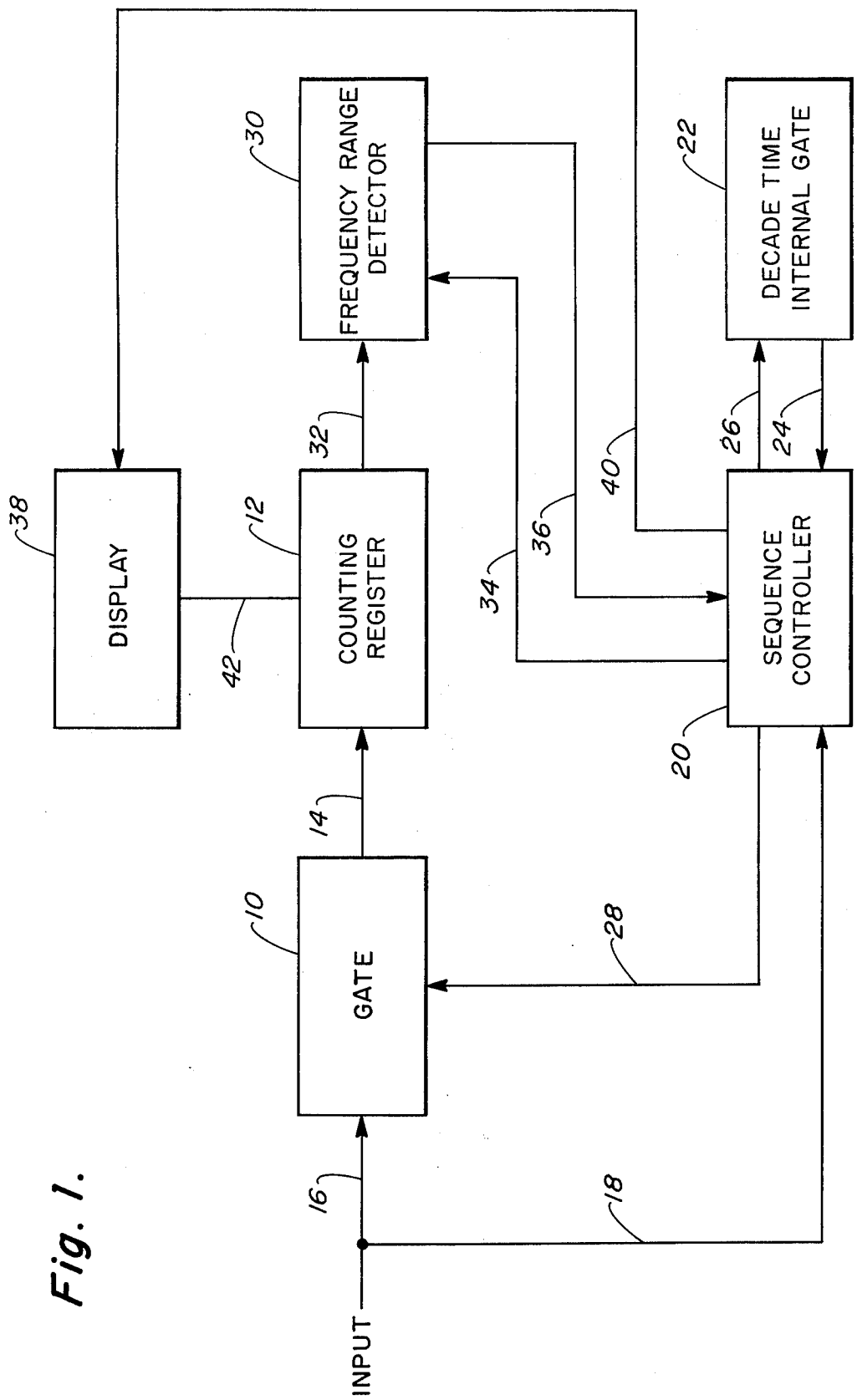
FIG. 1 is a block diagram of a specific embodiment of the present invention.

Referring to FIG. 1, a gate 10 passes an unknown frequency input signal to counting register 12 via line 14 for a measured amount of time. The input signal inputs gate 10 on line 16 and a sequence controller 20 via line 18. Sequence controller 20 is connected to decade time interval gate 22 via lines 24 and 26. Sequence controller 20 is connected to gate 10 via line 28.

Sequence controller 20 and decade time interval gate 22 control the commencement and duration of the measured amount of time gate 10 passes the input signal to counting register 12. At the end of the measured amount of time, gate 10 inhibits the input signal and a frequency range detector 30, connected to counting register 12 via line 32, detects and indicates the degree of filling of counting register 12. The degree of filling indication information is inputted to sequence controller 20 via line 36.

Line 34, connecting sequence controller 34 with frequency range detector 30, causes frequency range detector 30 to indicate that counting register 12 has attained a specific degree of filling, whether counting register 12 has or not when the last frequency range is reached.

Initially, gate 10 will pass the input signal to counting register 12 for a small initial measured amount of time. At the end of the initial measured amount of time, frequency range detector 30 detects the degree of filling of counting register 12. If a specific degree of filling is detected, then sequence controller 20 and decade time interval gate 22 set the measured amount of time to the initial measured amount of time. But, if the specific degree of filling is not detected, then sequence controller 20 and decade time interval gate 22 increase the measured amount of time by a decade. The measured amount of time is continually increased by a decade until frequency range detector 30 indicates that the specific degree of filling of counting register 12 has been attained.

When the specific degree of filling of counting register 12 is indicated to sequence controller 20 by frequency range detector 30, sequence controller 30 causes a display 38 to display the contents of counting register 12 as well as a decimal point and a frequency range. Display 38 is connected to sequence controller 20 via line 40 and to counting register 12 via line 42.

Sequence controller 20 and decade time interval gate 22 comprise a means for controlling the commencement and duration of the measured amount of time.

Figure 2:
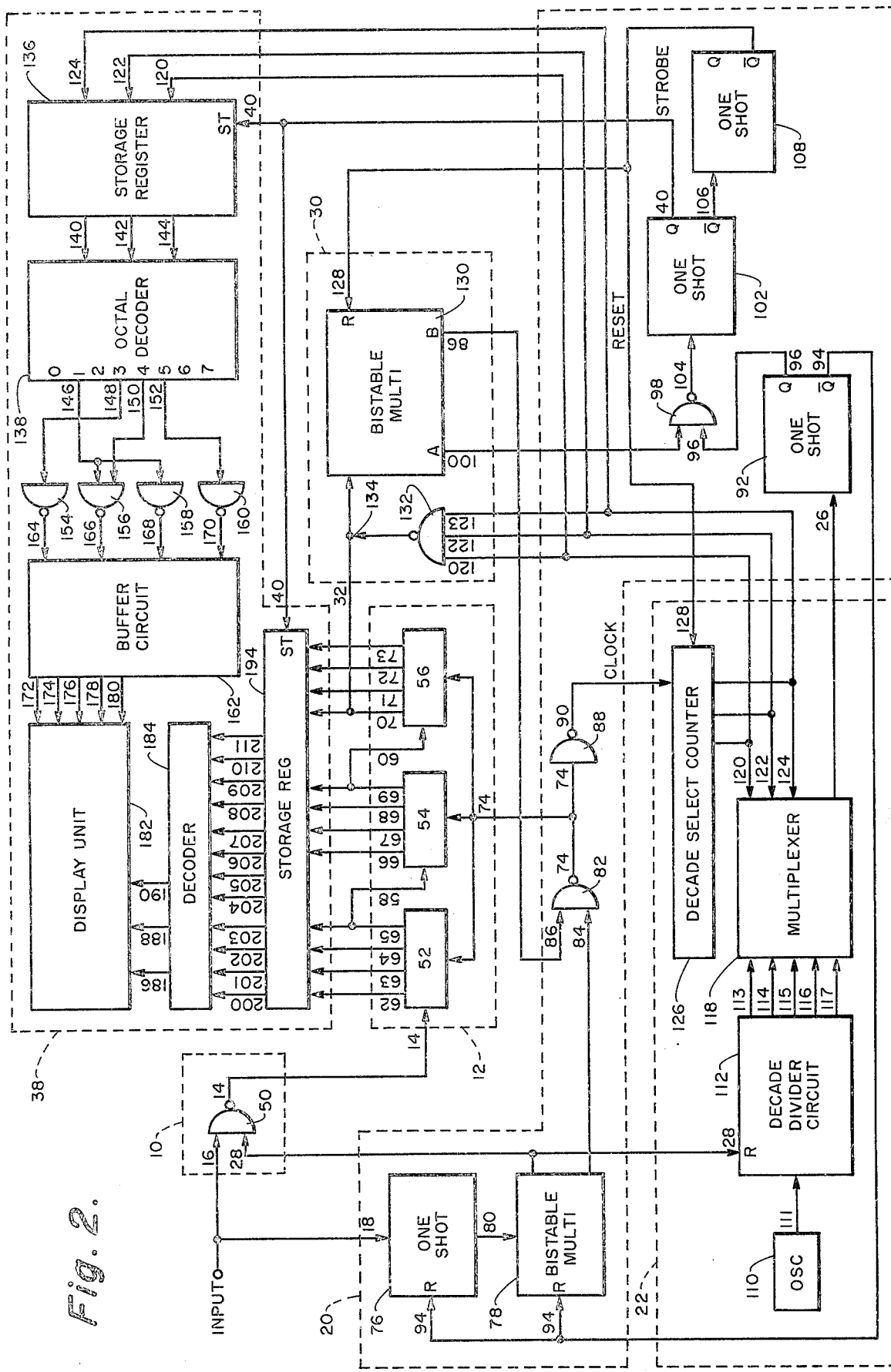
FIG. 2 is a schematic diagram of the specific embodiment of the present invention illustrated in FIG. 1.

Turning to FIG. 2, gate 10 comprises NAND gate 50 having inputs on lines 16 and 28 and an output on line 14. Line 14 connects NAND gate 50 with counting register 12.

Counting register 12 comprises binary counters 52, 54 and 56 connected in series by lines 58 and 60. Binary counter 52 is connected to gate 50 via line 14. Binary counter 52 has outputs on lines 62, 63, 64 and 65. Binary counter 54 has outputs on lines 66, 67, 68 and 69. Binary counter 56 has outputs on lines 70, 71, 72, 73 and 32. Line 32 is connected to line 70. Line 70 represents the least significant bit output of binary counter 56. Binary counter 56 is the last binary counter in the series, therefore, its four outputs on lines 70, 71, 72 and 73 represent the most significant number in the decimal representation of the frequency of the input signal counted by counting register 12. Binary counters 52, 54 and 56 have reset inputs on line 74 from sequence controller 20. Lines 62, 63, 64, 65, 66, 67, 68, 69, 70, 71, 72 and 73 represent line 40 of FIG. 1. It is noted that counting register 12 may include more than or less than three binary counters having four outputs. The more binary counters in counting register 12, the more significant figures the decimal representation of the frequency of the input signal will have. Of course, for each additional binary counter added to counting register 12, modifications must be made to decade time interval gate 22 as will be discussed supra.

Sequence controller 20 comprises one-shot 76 inputted by the unknown frequency input signal on line 18. One-shot 76 is connected to bistable-multi 78 via line 80. Bistable-multi has an output on line 28 to NAND gate 50 and decade time interval gate 22. Line 28, connected between sequence controller 20 and decade time interval gate 22, is not shown in FIG. 1 in order to simplify the block diagram. Bistable-multi 78 is connected to NAND gate 82 via line 84. NAND gate 82 is also inputted on line 86. NAND gate 82 is connected to NAND gate 88 via line 74. NAND gate 88 outputs on line 90.

One-shot 92 is inputted from decade time interval gate 22 on line 26. The $\overline{Q}$ output of one-shot 92 is connected to one-shot 76 and bistable-multi 78 via line 94. The Q output of one-shot 92 is inputted to NAND gate 98 via line 96. Also inputting NAND gate 98 is line 100 from frequency range detector 30. The output of NAND gate 98 inputs one-shot 102 on line 104. The $\overline{Q}$ output of one-shot 102 inputs one-shot 108 on line 106. The Q output of one-shot 102 inputs display 38 on line 40.

Decade time interval gate 22 comprises an oscillator 110 connected to a decade divider circuit 112 via line 111. Decade divider circuit 112 is a plurality of series-connected binary dividers. Oscillator 110 inputs the first of the binary dividers. The output of each series-connected binary divider is a signal that is a decade below the signal inputting it. For example, assuming the output on line 111 of oscillator 110 was a 10 MHz signal, then the output of the series-connected first binary divider would be a 1 MHz signal; the output of the second series-connected binary divider would be a 100 KHz signal, and so on down to a 1 Hz output for the last series-connected binary divider. The output of decade divider circuit 112 on line 113, 114, 115, 116 and 117, for example, could be a 10 KHz signal on line 113, a 1 KHz signal on line 114, a 100 Hz signal on line 115, a 10 Hz signal on line 116, and a 1 Hz signal on line 117.

Lines 113, 114, 115, 116 and 117 input multiplexer 118. Also, inputting multiplexer 118 on lines 120, 122 and 124 is decade selected counter 126. Inputting decade select counter 126 is a clock signal from NAND gate 88 on line 90. Multiplexer 118 outputs on line 26 one of the signals present on lines 113, 114, 115, 116 or 117, determined by the signals on lines 120, 122 and 124. Also, inputting decade select counter 126 is a reset signal from the Q output of one-shot 108 on line 128.

Decade select counter 126 is a binary counter whose outputs increase by 1 each time a clock signal is received on line 90. Decade select counter 126 is reset to zero when a reset signal is received on line 128. For example, assume the outputs on lines 120, 122 and 124 are 000, respectively. If a clock signal is received on line 90, the outputs on lines 120, 122 and 124 will be 001, respectively, thus causing the signal on line 113 to appear on line 26. If a second clock pulse is received on line 90, the outputs on lines 120, 122 and 124 will be 010, respectively, thus causing the signal on line 114 to appear on line 90. This sequence is continued as long as clock pulses are received on line 90.

Frequency range detector 30 comprises bistable-multi 130, inputted on line 32, from counting register 12. Also, inputting bistable-multi 130 is a reset signal on line 128 from the $\overline{Q}$ output of one-shot 108. Bistable-multi 130 has outputs on lines 100 and 80 to NAND gate 98 and NAND gate 82, respectively. NAND gate 132 inputs bistable-multi 130 on line 134 via line 32. Inputting NAND gate 132 are lines 120, 122 and 124 from decade select counter 126.

Display 38 comprises storage register 136, inputted by lines 120, 122, 124 and 40. Storage register 136 is connected to octal decoder 138 by lines 140, 142 and 144. Octal decoder 138 receives the binary signal on lines 140, 142, and 144, converts it to octal, and outputs a signal pulse on lines 146, 148, 150 or 152. NAND gate 154 is inputted by line 148. NAND gate 156 is inputted by lines 146 and 150. NAND gate 158 is inputted by line 146, and NAND gate 160 is inputted by line 152. NAND gates 154, 156, 158 and 160 input buffer circuit 162 on lines 164, 166, 168 and 170, respectively. Buffer circuit 162 is connected to display unit 182 by lines 172, 174, 176, 178 and 180.

Also inputting display unit 182 is decoder 184 on lines 186, 188 and 190. Decoder 184 is connected to storage register 194 via lines 200, 201, 202, 203, 204, 205, 206, 207, 208, 209, 210 and 211. Storage register 194 is connected to counting register 12 by lines 62 – 73. Also, inputting decoder 184 is a strobe signal on line 40 from one-shot 103. Decoder 184 makes the binary representation of the bits on lines 62 – 73 compatible with the display unit 182. For example, display unit 182 may include three seven-segment lamps or nixie tubes, one inputted by line 186, one by line 188, and one by line 190. The signal on line 190 would represent the digital binary representation on lines 70 – 72. The signal on line 188 would represent the digital binary representation on lines 66 – 69. The signal on line 186 would represent the digital binary representation on lines 62 – 65.

The circuit consisting of buffer circuit 162, octal decoder 138, storage register 136, NAND gates 154, 156, 158 and 160, and related interconnections provides display unit 182 with a signal to display the decimal point and the frequency range of the input signal on lines 16 and 18.

A discussion of the operation of the circuit of FIG. 2 follows. Initially, both counting register 12 and decade select counter 126 are reset to zero and the output of bistable-multi 78 on line 28 is low, which maintains the outputs on lines 113 – 117 of decade divider circuit 112 at zero. Of course, the output on line 84 of bistable-multi 78 is high. In addition, the outputs on lines 100 and 86 and bistable-multi 130 are low and high, respectively. The circuit of FIG. 2 is now in a standby condition.

At the instant a negative transition occurs on line 18, one-shot 76 triggers, placing a negative pulse on line 80, thereby causing the outputs on lines 28 and 84 of bistable-multi 78 to go high and low, respectively. The high on line 28 enables NAND gate 50, thereby allowing the input signal on line 16 to input counting register 12, and releases the reset to decade divider circuit 112, thereby allowing signals a decade apart in frequency to appear on lines 113 – 117. Counting register 12 counts from 000 to 999.

The low on line 84 from bistable-multi 78 causes a high to appear on line 74 the output of NAND gate 82, which removes the reset signal to counting register 12 via line 74. The high on line 74 is inverted by NAND gate 88, providing a low on line 90, thereby clocking decade select counter 126 so that the outputs on lines 120, 122 and 124 change from 000 to 001.

Assuming line 113 has a 10 KHz signal on it, multiplexer 118 will now take 100 microseconds to give a negative transition on line 26. This will allow a maximum of 999 times 10 KHz to be read by counting register 12 or a maximum of 9.99 MHz, which would be the upper limit of the circuit of FIG. 2, if the signal on line 113 were 10 KHz and there were three binary counters in counting register 12. As noted, infra, there is a relationship between the number of binary counters contained in counting register 12 and the frequency of the signals on lines 113 – 117. For example, if counting register 12 contained four binary counters and the signal on line 113 was 10 KHz in frequency, then the upper limit of the circuit of FIG. 2 would be 9999 × 10 KHz or 99.99 MHz. Returning to three binary counters contained in counting register 12, as shown in FIG. 2, the lowest frequency count required in this range to give three significant bits is 1.00 MHz. Therefore, a "one" must be detected on line 70 by bistable-multi 130 at some time during the counting period or measured amount of time in order to cause bistable-multi 130's outputs on line 86 and 100 to change from high and low to low and high, respectively. It is noted that when a "one" is detected on line 70 by bistable-multi 130 that the correct frequency range of the input signal on line 16 has been found.

When the counting period or measured amount of time ends, a negative transition occurs on line 26 which triggers one-shot 92. The negative transition on line 26 occurs at the termination of one period of the a-c signal chosen to appear on line 26 from lines 113–117 by multiplexer 118. Thus, the counting period or measured amount of time is equal to one period of the a-c signal switched onto line 26 by multiplexer 118. The signal on line 94 goes low, which puts a reset on one-shot 76, disabling it and resets bistable-multi 78.

If a "one" was detected on line 70 by bistable-multi 130 during the counting period or measured amount of time, then the high on line 96, combined with the high on line 100, causes a low pulse on line 104 from NAND gate 98, which triggers one-shot 102. One-shot 102 then strobes storage register 136 and 194 via line 40 causing these inputs to appear on their outputs, thereby causing display unit 182 to display the contents of storage register 194, a decimal point, and a frequency range. As an example of the frequency range and decimal point display, assume lines 140, 142, and 144 have bits 001, respctively, on them. This will cause signals to appear on lines 166 and 168 which, after passing through buffer circuit 162, can be used to cause single filament lamps properly placed in display unit 182 to light. Of course, a nixie tube display for the contents of storage register 194 was discussed, infra.

The following edge of the pulse appearing on line 106 then triggers one-shot 108, which resets bistable-multi 130 and decade select counter 126 via line 128. It is noted that the time period of one-shot 92 is longer than the combined time periods of one-shots 102 and 108.

Bistable-multi 130 and 78, having been reset, places highs on lines 86 and 84, which causes a low to appear on line 74, thereby resetting counting register 12. Bistable-multi 78 also resets decade divider circuit 112 via line 28 and disable NAND gate 50 via line 28. The entire circuit of FIG. 2 is now reset and ready to begin the seqence all over again with the readout remaining until updated by a new cycle.

If a negative transition occurs on line 26 without a "one" being detected on line 70 by bistable-multi 130 indicating the correct frequency range has not been found, a low remains on line 100, causing a high to remain on line 104 so that one-shots 102 and 108 are not triggered. Bistable-multi 78 and one-shot 76 are still reset via line 94. This places a high on line 84, which, combined with the high on line 86, causes a low to appear on line 74, thereby resetting counting register 12. NAND gate 88 inverts the high on line 74, causing a low to remain on line 90. Thus, the circuit of FIG. 2 is reset and ready for the next negative input transition on line 18 without decade select counter 126 being reset.

The next negative transition on line 18 triggers one-shot 76, causing the signal on line 84 from bistable-multi 78 to go low, causing the signal on line 74 to go high and the signal on line 90 to go low, which clocks decade select counter 126 one more count to be 010.

Therefore, the bits on lines 120, 122 and 124 are 010, respectively, thereby causing multiplexer 118 to output on line 26 the signal on line 114.

It is noted that the signal on line 114 is a decade below, in frequency, the signal on line 113; thus, the measued amount of time that NAND gate 50 will be enabled will be ten times longer than before.

The above process is continued until a "one" is detected on line 70 by bistable-multi 130. However, if a "one" is not detected on line 70 by the time decade select counter 126 has been clocked five times, i.e., ouputs on lines 120, 122 and 124 are 1, 0, and 1, respectively, NAND gate 132 causes bistable-multi 130 to change state, forcing the contents of storage registers 194 and 136 to be displayed. It will be noted that if the signal on line 113 is 10 KHz, then the signal on line 117 is 1 Hz. When lines 120, 122, and 124, are 1, 0, and 1, respectively, multiplexer 118 passes the signal on line 117 to line 26, thereby indicating that the frequency of the input signal on line 18 is between 0 Hz and 999 Hz. Of course, if display unit 182 contained three nixie tubes and decimal and frequency range lights properly placed, then the Hz light would light, no decimal point light would light, and the nixie tubes would display the correct frequency of the input signal on line 16.

It is noted that by testing for the correct frequency range by initially using the smallest measured amount of time and increasing that measured amount of time by a decade until the correct frequency range is reached, the present invention is able to attain the fastest possible operating time. This is contrasted with prior art automatic ranging frequency counters that do not initially use the smallest measured amount of time but start somewhere in between the smallest and largest measured amount of time and go up or down from there.

In addition, it is noted that if the output of the first two series-connected binary decade dividers of decade divider circuit 112 are utilized to input multiplexer 118, an undesirable but not inoperative ripple effect occurs on line 26. But, only utilizing the outputs from the third series-connected binary decade divider on down to the last one, the ripple effect on line 26 is reduced from 10 to 0.1%.

It is noted that the maximum range of the circuit of FIG. 2 could be expanded by utilizing additional binary counters in counting register 12 by increasing the number of signals outputted by decade divider circuit 112, and by increasing the number of outputs from decade select counter 126 to multiplexer 118. Of course, the display 38 would need minor modifications that would be obvious to one of ordinary skill in the art. It is noted that for each decade higher frequency signal outputted by decade divider circuit 112 or each additional binary counter added to counting register 12, the frequency range of the circuit of FIG. 2 is increased by a decade.

It is noted that lines 200 – 211 of FIG. 2 comprise line 42 of FIG. 1. Lines 86 and 100 of FIG. 2 comprise line 36 of FIG. 1. Line 120, 122 and 124 comprise line 34 of FIG. 1. Lines 90, 128 and 28 of FIG. 2 comprise line 28 of FIG. 1.

It will be appreciated by those skilled in the art that the complete circuit diagram of FIG. 2 includes such suitable and necessary biasing voltage sources as are usually provided in an automatic ranging frequency counter. Such biasing is not shown in FIG. 2.

Obviously, numerous modifications and variations of the present invention are possible in light of the above teachings. It is therefore to be understood that within the scope of the appended claims the invention may be practiced otherwise than as specifically described herein.

I claim:

1. An automatic ranging frequency counter comprising:
    a. means for providing an input signal of unknown frequency;
    b. a single counting register;
    c. means for gating said input signal to said counting register for a measured amount of time;
    d. a frequency range detector for detecting and indicating the degree of filling of said counting register; and
    e. a sequence controller for controlling the opening and closing of said means for gating, said controller being connected between the frequency range detector and said means for gating, said controller also being connected to said means for providing an input signal;
    f. means for generating a plurality of a-c signals, said plurality of a-c signals forming a decade spectrum in frequency, each said a-c signal being, in frequency, a decade below the a-c signal above it and a decade above the a-c signal below it, said means being inhibited when said means for gating is not gating said input signal to said counting register as indicated by said sequence controller; and
    g. means for selecting and passing one said a-c signal of said plurality of a-c signals to said sequence controller, the period of said one a-c signal being said duration of said measured amount of time, initially the highest frequency a-c signal is passed to said sequence controller providing an initial measured amount of time, said means for selecting and passing being controlled by said sequence controller such that after the initial highest frequency a-c signal is passed and the initial measured amount of time ends, if said frequency range detector indicates a specific degree of filling, said means for selecting and passing will pass the highest frequency a-c signal to said sequence controller, but if said means for detecting and indicating indicates a lack of a specific degree of filling, said means for selecting-and-passing will pass the a-c signal a decade in frequency below the last passed a-c signal to said sequence controller.

2. The automatic ranging frequency counter of claim 1 further comprising means for displaying the contents of said counting register, a decimal point and a frequency range, said means being connected with said means for controlling the commencement and duration of said measured amount of time and with said counting register.

3. The automatic ranging frequency counter of claim 2 wherein said means for controlling the commencement and duration of said measured amount of time includes means for causing said display means to display after said measured amount of time ends, provided said frequency range detector indicates a specific degree of filling of said counting register.

4. The automatic ranging frequency counter of claim 1 wherein said means for selecting and passing includes:
    a. a multiplexer connected to said means for generating a plurality of a-c signals; and
    b. means connected to said multiplexer for causing said multiplexer to pass one said a-c signal of said plurality of a-c signals to said sequence controller, said means being controlled by said sequence controller so that said input signal is counted for the period of the highest frequency a-c signal, then if said frequency range detector indicates said most significant bit is filled, said means is reset, thereby causing said multiplexer to pass said highest frequency a-c signal, but if said frequency range detector indicates said most significant bit is not filled, said means is clocked, thereby causing said multiplexer to pass the next highest frequency a-c signal which is one decade below said highest frequency a-c signal, the above sequence continuing until said means for detecting and indicating indicates to said sequence controller that said counting register has attained a specific degree of filling.

5. The automatic ranging frequency counter of claim 4 wherein said frequency range detector is connected to said least significant bit of said last binary counter, thereby indicating the degree of filling of said counter register.

6. The automatic ranging frequency counter of claim 4 wherein said means for causing said multiplexer to pass one said a-c signal of said plurality of a-c signals to said sequence controller further comprises a decade select counter having a plurality of outputs connected to said multiplexer, a clock input connected to said sequence controller, and a reset input connected to said sequence controller.

7. The automatic ranging frequency counter of claim 1 wherein said counting register includes a plurality of binary counters connected in series to form a multi-bit counter, each said binary counter having four output bits, said plurality of binary counters having a last binary counter being the last binary counter in said series, said last binary counter indicating the most significant number in the decimal representation of the frequency of said input signal counted.

* * * * *